United States Patent [19]
Craig et al.

[11] 4,101,836
[45] Jul. 18, 1978

[54] SECTORED ANTENNA RECEIVING SYSTEM

[75] Inventors: Timothy Philip Craig, Georgetown, Ky.; James Roy Stimple, Hoffman Estates, Ill.

[73] Assignee: Motorola, Inc., Schaumburg, Ill.

[21] Appl. No.: 792,963

[22] Filed: May 2, 1977

[51] Int. Cl.² .................................... H04B 7/08
[52] U.S. Cl. ................... 325/302; 325/304; 325/370
[58] Field of Search ............ 325/302, 304, 366, 370, 325/56

[56] References Cited

U.S. PATENT DOCUMENTS

| | | | |
|---|---|---|---|
| 2,485,576 | 10/1949 | Dodington | 325/370 |
| 3,095,538 | 6/1963 | Silberstein | 325/304 |
| 3,206,679 | 9/1965 | Miller | 325/302 |
| 3,368,151 | 2/1968 | Verwey et al. | 325/370 |
| 3,860,872 | 1/1975 | Richardson et al. | 325/304 |

Primary Examiner—Robert L. Griffin
Assistant Examiner—Marc E. Bookbinder
Attorney, Agent, or Firm—James P. Hamley; James W. Gillman

[57] ABSTRACT

A plurality of horizontally directive antenna sectors are arranged in configuration to receive signals from remote transmitters over a given angle in the horizontal plane. A scanning system is operative in one of several modes to sequentially couple each sector to a receiver. In its first mode, each sector is sequentially scanned with the output signal level therefrom being compared to a reference level. If the signal level on any sector exceeds the reference level the scanner activates to its second mode wherein scanning continues for a predetermined interval. At the end of the interval, scanning is inhibited and the receiver is coupled to that sector which produced the strongest signal level during the second mode scanning cycle. In the inhibit scan mode, if the signal level from the sector falls to a minimum level for a given time period the system reverts to the first scanning mode.

24 Claims, 5 Drawing Figures

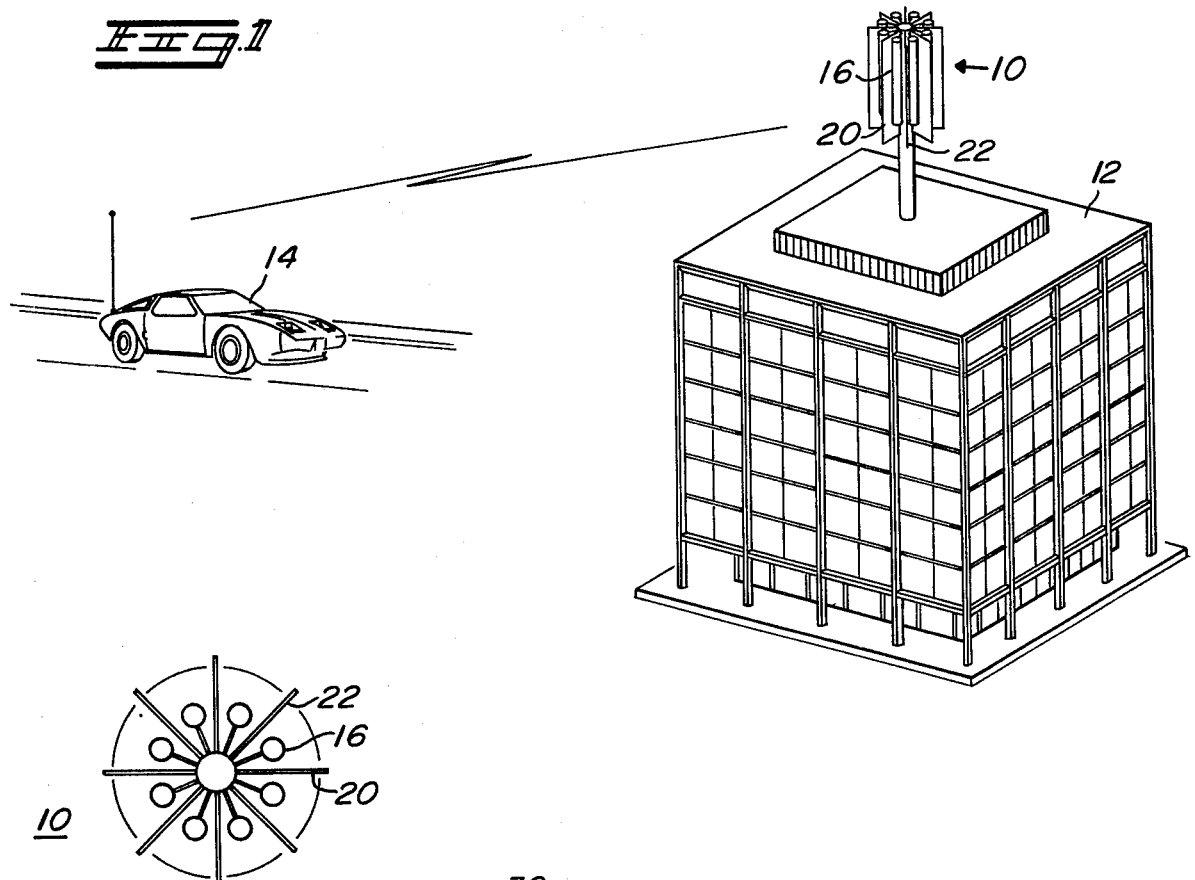
Fig. 1
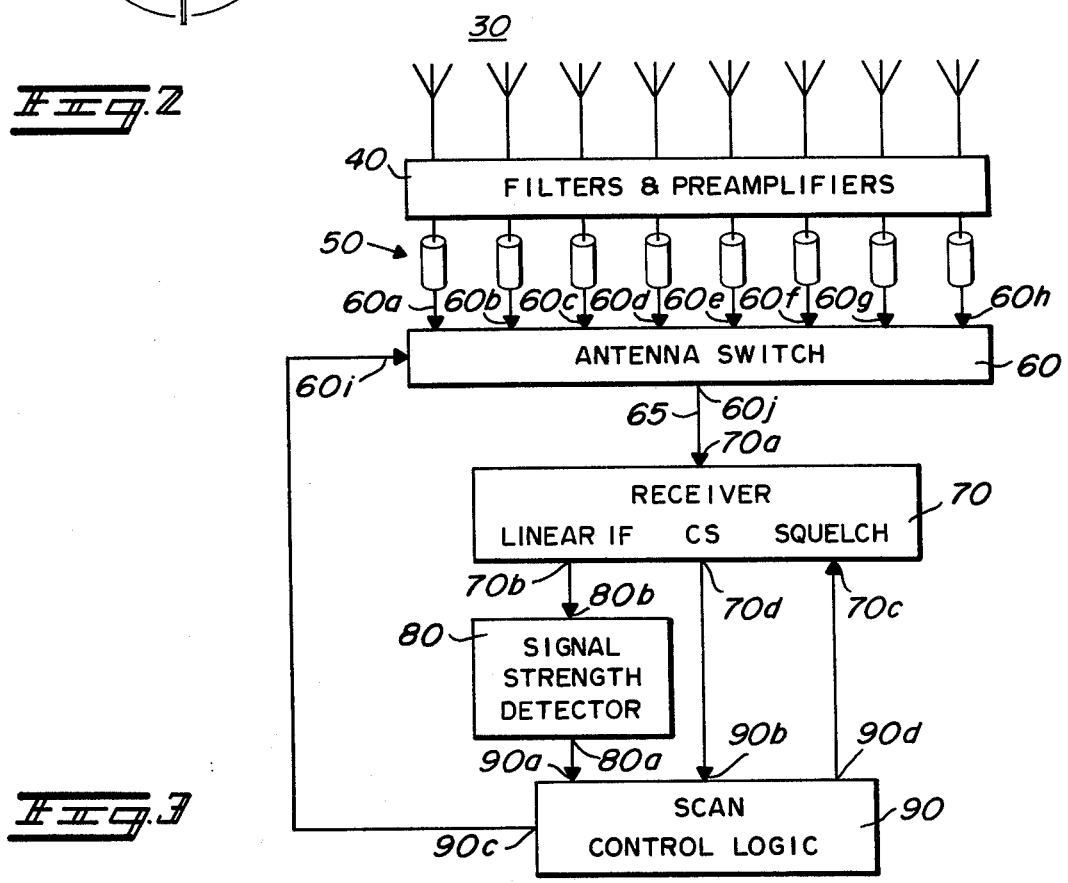
Fig. 2
Fig. 3

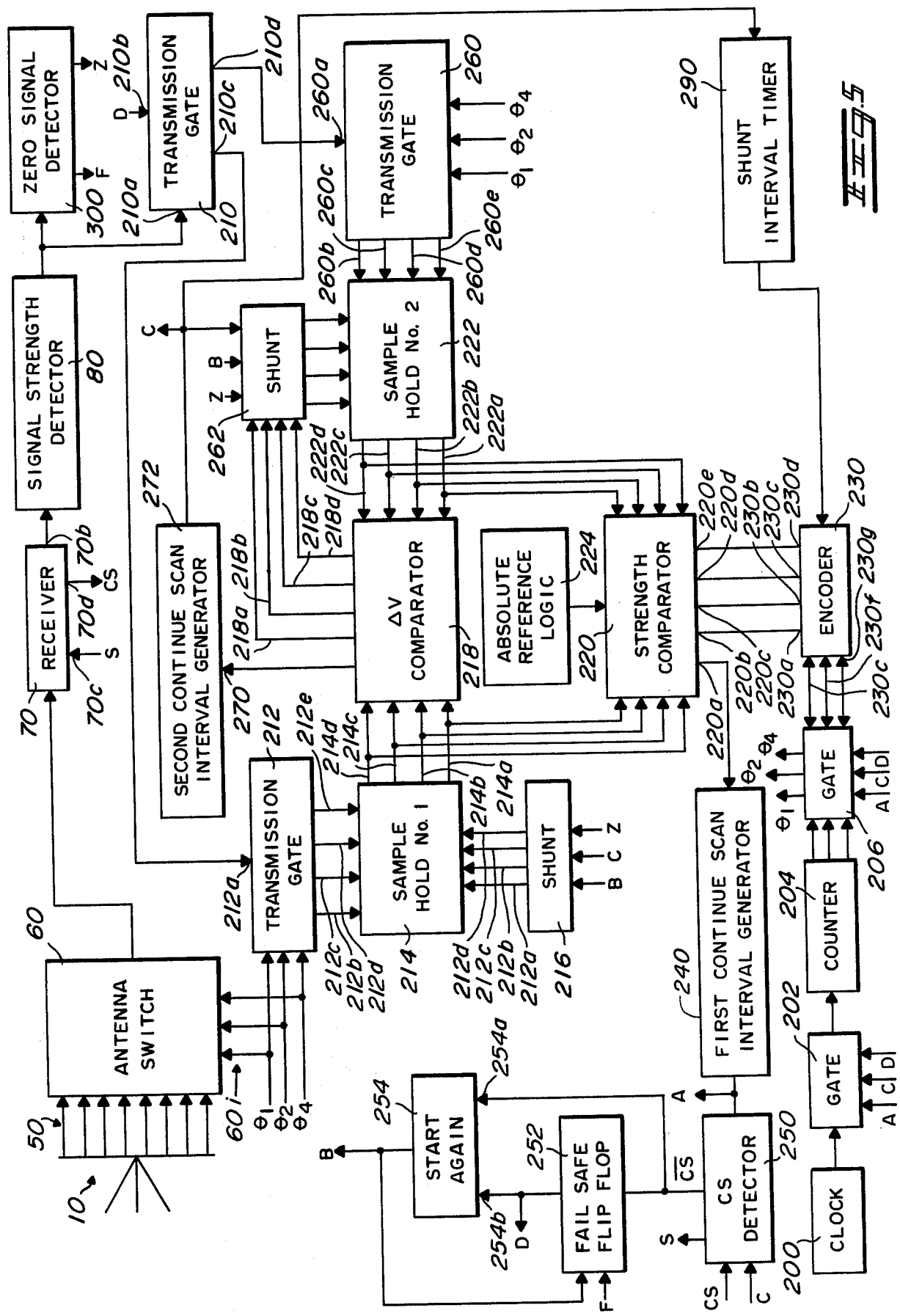

SECTORED ANTENNA RECEIVING SYSTEM

BACKGROUND OF THE INVENTION

The present invention pertains to the radio communication art and, in particular, to a sectored antenna receiving system.

Several types of sectored antenna receiving systems have been developed for application in the radio frequency communication art. Sectored antenna systems are commonly used in applications wherein the remote transmitter whose signal is to be received may be positioned in any one of multiple locations. Thus, such systems are normally designed in moving vehicle type applications. By using a sectored antenna array, as opposed to, for example, an omnidirectional antenna, signal to noise performance can be significantly enhanced thus producing a superior communication system.

The prior art sectored array antenna systems, in so far as they relate to the present application, fall into basically two classes. The first class contemplates a multiple sector, single receiver arrangement in which the receiver is controlled by a sampling routine to continuously scan all sectors. Hence, for the condition wherein there is no received signal on any sector the routine calls for the receiver to sample each sector for an equal period of time. Once a transmitted signal is detected on a sector, the duty cycle is changed whereby the receiver dwells on that sector for a disproportionate period of time. Nonetheless, the receiver continues to constantly sample the other sectors in anticipation of a stronger signal thereon.

The second class of sectored array receiving systems employs a pair of receivers. A search receiver constantly scans each sector in the array in an attempt to find that sector which receives the best signal. A service receiver is coupled to that sector with the best signal until the search receiver discovers that another sector is receiving a superior signal at which time an appropriate antenna switching is accomplished to the service receiver.

Such prior art scanning systems of the first class type have proven effective for applications wherein the remote transmitter is likely to jump from the coverage area of one sector to another sector in a reasonably short time as, for example, in aircraft communication. However, for an application such as in land mobile systems wherein the length of a communication message is sufficiently short compared to the coverage area of a sector and the speed of the vehicle such that a particular sector is likely to produce the best signal for the duration of the message. Such first class type prior art scanning systems are not desirable in applications such as the land mobile type since they necessarily require a constant switching from one sector to another resulting in an annoying gap in communication.

The prior art systems of the second class type have proven undesirable in that they require a pair of receivers. This significantly increases the cost of the system as well as system size while necessarily decreasing system reliability due to the duplication of parts.

SUMMARY OF THE INVENTION

It is an object of this invention, therefore, to provide a sectored antenna receiving system which is particularly adapted for use in applications such as of the land mobile type.

Briefly, according to the invention, the radio frequency communication system includes a sectored antenna array which includes a plurality of sectors, each of which is predeterminedly oriented with respect to the remaining sectors. An antenna switch couples to each of the sectors in response to a control signal at its control terminal to couple a selected one of the sectors to an output terminal. The output terminal from the antenna switch is suitably coupled to a radio frequency receiver. The receiver includes a signal strength detector which produces a signal representative of the strength of the radio frequency signal being received from each sector. Scan control logic circuitry has an input coupled to the receiver signal strength detector and an output coupled to the control terminal of the antenna switch. The scan control logic circuitry is operable in a first mode to produce control signals at its output which cause sequential coupling of the sectors to the receiver such that the antenna sectors are sequentially scanned. A comparator within the control logic monitors the signal strength of the signal from each sector in response to a given input signal exceeding a predetermined magnitude to activate a scan control logic circuitry to a second mode. In a second mode, the scan control logic causes a continued sector scanning for predetermined interval after which scanning is inhibited and the receiver is coupled to that sector which produces the greatest detected signal strength.

The receiver is constantly coupled to that sector which received the strongest signal during the continuing sample mode of the scan control logic means until such time as the received signal drops below a given level for a given time period, at which time the system reverts to its first mode, i.e. general scanning of all sectors.

BRIEF DESCRIPTION OF THE DRAWINGS

FIG. 1 illustrates an eight sector horizontally directive antenna array mounted atop a building which is suitable for communication with a remotely located vehicular transmitter;

FIG. 2 is a top view of the radiation pattern of the eight sectored antenna array shown in FIG. 1;

FIG. 3 is a generalized block diagram of the sectored antenna receiving system according to the invention;

FIG. 5 is a detailed block diagram illustrating operation of the preferred embodiment of the invention.

DETAILED DESCRIPTION OF THE PREFERRED EMBODIMENT OF THE INVENTION

Figure 4:
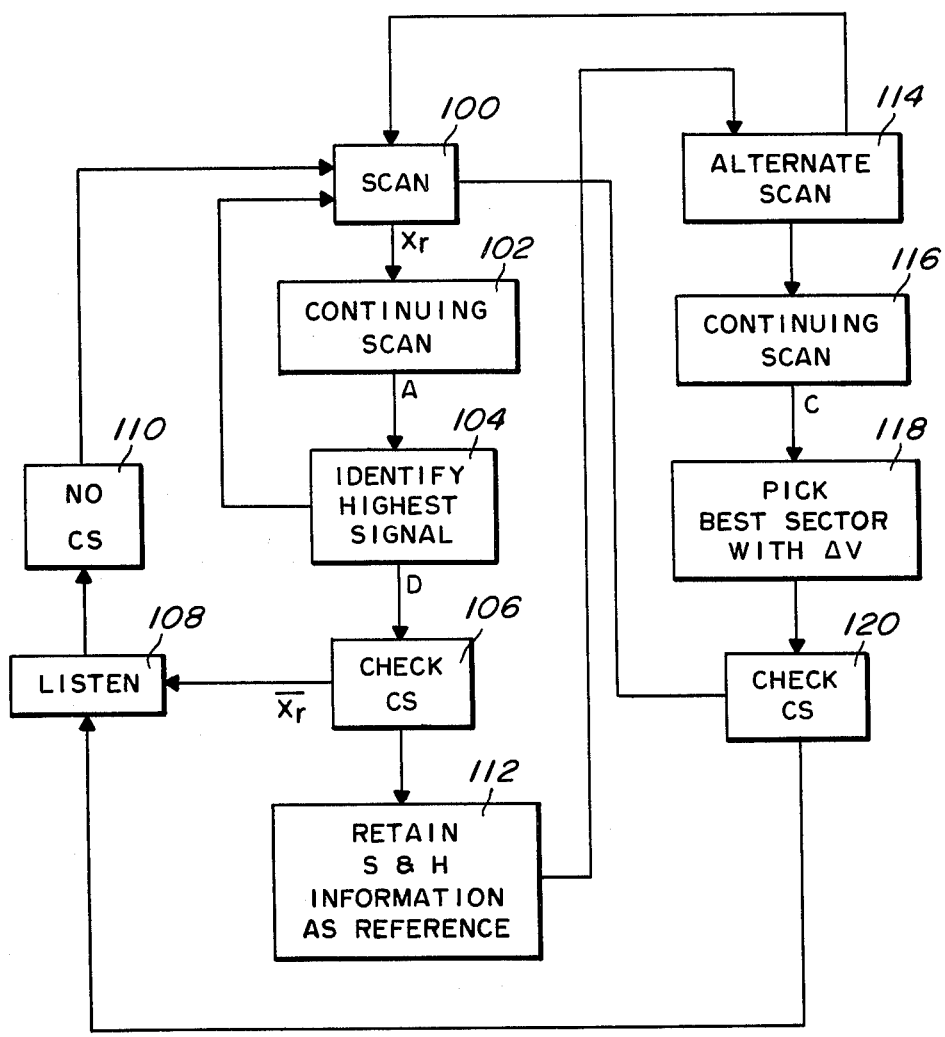
FIG. 4 is an algorithm illustrating operation of the scan control logic according to the invention.

FIG. 1 illustrates a preferred application of the invention used as a communication system for land mobile operation. Here, a sectored antenna array 10 is shown mounted atop a building 12. Communication from the array is to be established with a remotely located transmitter which is illustrated as being carried by the vehicle 14.

The array 10 includes eight sectors, one of which is indicated at 16, which are nestled between 45° angle reflectors, two of which are indicated at 20 and 22. Each sector is horizontally directive and is predeterminedly oriented with respect to the remaining sectors such that all sectors in the array are capable of covering a total horizontal angle of 360°. It should be understood that, depending upon the particular application, any number of sectors may be employed and the sectors may be arranged to cover any desired receiving angle.

Horizontally directive antenna sectors are well known in the antenna art and are commercially available from many manufacturers such that a detailed description thereof is unnecessary.

FIG. 2 is a top view of the antenna array 10 showing the eight antenna elements, one of which is indicated at 16 and the 45° reflectors, two being shown at 20, 22. As a result of the design of the antenna sector and its corresponding reflectors each antenna sector is capable of receiving transmitted signals which are generated from within a defined horizontal angle. It should be understood that since each sector of the antenna array is directional, the array is capable of superior signal to noise performance over an omnidirectional antenna. The fact that the sectors are horizontally polarized further enhances the signal to noise characteristics.

FIG. 3 is a generalized block diagram which illustrates the fundamental building blocks of the preferred embodiment of the invention. Here, the array of sectored antenna elements 10 are mounted, as for example in FIG. 1, in predetermined orientation on top of a suitable structure. Each antenna sector feeds to a filter and preamplifier circuit 40 which provides gain to the sector received signals at those frequencies of interest. The amplified sectored received signals pass over coax cables 50 to an antenna switch 60. The antenna switch 60 comprises a plurality of input terminals 60a–60h, an output terminal 60j and a control input terminal 60i. In response to control signals received at its control input terminal 60i, the antenna switch 60 couples a selective one of the sectors 10 to the antenna switch output terminal 60j.

The output 60j from the antenna switch 60 is coupled via a suitable conductor 65 to the input 70a of a radio frequency receiver 70. Radio frequency receiver 70 is of conventional design in that it mixes the input radio frequency signals to an intermediate frequency, thereafter filtering the signals via an intermediate frequency stage, detecting the signals and reproducing the signals as audio or data outputs. The output from the intermediate frequency stage is available at a receiver output terminal 70b. The receiver includes conventional squelch circuitry such that when an appropriate signal is applied at a squelch input terminal 70c the output from the receiver may be diasabled. In addition, the receiver includes decoding circuitry capable of detecting the presence of a coded signal on the incoming sector received signal. Such coding systems are very common in land mobile communications systems and normally would include information as to the identity of the transmitting station as well as other pertinent information of use to the system. Commonly, such coded signals are predetermined subaudible or audible tones which may be decoded by the presence of suitable bandpass filters, vibrating reeds, or the like. A second output 70d from the receiver is activated in response to the receiver decoding the presence of a coded signal on the sector received signal.

The intermediate frequency output 70b from the receiver is coupled to a signal strength detector 80 which, as is shown in FIG. 3, may be a separate unit, or it may be incorporated within the receiver 70. The signal strength detector 80 produces a signal at its output 80a which signal is indicative of the level of signals received at its input 80b. The signal strength signals are in turn passed to the first input 90a of the scan control logic circuitry 90. The second input 90b of the scan control logic 90 couples to the coded signal output 70d of the receiver 70. The scan control logic circuitry 90 processes its input signals and produces appropriate control signals on its first output 90c which are in turn coupled to the control input terminal 60f of the antenna switch 60. Also, appropriate signals are created at the scan control logic second output 90d which are coupled to the squelch input 70c of the receiver 70. Detailed operation of the scan control logic 90 is fully described herein below with respect to FIGS. 4 and 5. Briefly, the scan control logic 90 responds to its received input signals to operate the sectored receiving system in one of a number of modes. For the condition wherein none of the sectors receives an input signal above a predetermined level, a control signal from the scan control logic applied to the control input terminal 60f of the antenna switch 60 causes the receiver to be sequentially coupled to each of the antenna sectors. Once a sector receives a signal whose amplitude is such that the output from the signal strength detector is above the given threshold level, the scan control logic operates the system in a second, or continuing scan mode. In this mode each antenna sector is again scanned for a predetermined continuing scan time, with the relative signal strength from each sector being stored in a first sample and hold array within the scan control logic 90. At the end of the continued sampling period that sector which recorded the largest signal during both scanning intervals is coupled to the receiver. If the system is not operating in the coded signal mode, the receiver will remain coupled to that sector until such time as the signal therefrom drops to a predetermined level for a predetermined time period.

If, however, the system is operating in a mode whereby it only responds to input signals which contain a coded signal, at the end of the continuing sampling period the receiver will be coupled to that sector which receives the strongest signal just as in the uncoded case. If, after a predetermined time, the receiver has not detected a valid code the signal is designated as an interferer. The scan control logic then operates the system in an alternate scan mode wherein a general scan of the sectors is made as in the first mode but the output from each sector is applied to a second sample hold array. Now, each input from a sector to the second sample hold array is compared with the stored peak value for that sector in the first sample hold array caused by the interferer. It the signal strength from any sector in the second sample hold array is a predetermined voltage $\Delta V$ above its stored value in the first sample hold array the scan control logic once again activates the system to the continuing scan mode. As before, in the continuing scan mode all sectors are scanned for a predetermined time interval, with the peak value signal level from each sector being stored now in the second sample hold array. At the end of the continuing scan interval the scan control logic couples the receiver to that sector which has the greatest signal level and has the predetermined $\Delta V$. As before, the logic then checks to determine whether or not the signal received by the selected sector contains the proper coded signal. If it does, the receiver continues to be coupled to that sector until the signal from that sector diminishes to a given level for a predetermined time period or the coded signal is lost. If that signal does not contain the coded signal the scan control logic causes the system to revert to the first, or general scan mode.

It should be pointed out that in land mobile sectored communication systems, the length of any given message is generally short compared to the time it would take for a vehicle to move from the area covered by one sector to that covered by another. Thus, once the scan control logic determines which of the sectors is receiving the best signal from the mobile, it is desirable to inhibit scan and couple that sector directly to the receiver.

FIG. 4 is a flow diagram illustrating the algorithm used to derive the scanning mode as described above for the preferred embodiment of the invention.

Initially, all sectors of the array are sequentially sampled by being coupled to the receiver as is indicated by the scan block 100. The signal strength from each sector is compared with an internal absolute reference level such that if any sector signal exceeds the reference level $\overline{X}_r$ for the system is activated to the continuing scan mode 102. In this mode, the sectors continue to be scanned for a predetermined time interval with the peak value of signal strength from each sector being stored in a sample and hold array. At the conclusion of the continuing scan mode a signal A is generated which causes circuitry indicated by block 104 to identify that sector which has produced the highest peak received signal strength during the continuing scan mode. If during this time the signal should suddenly drop out, i.e. diminish in value to such extent, and for such interval that it is indicative that the signal is no longer being received, an appropriate signal is created $\overline{X}_r$ which causes reinitiation of the scan mode. However, if the signal is still present the sector producing the highest received signal strength during the continuing scan mode continues to be coupled to the receiver and a signal D is created. Signal D activates circuitry represented by block 106 which determines whether or not the signal being received by the selected sector contains the appropriate coded signal. If the proper coded signal is present, indicative of the fact that the received signal is from a remote transmitter to which communication should be received, a CS signal is generated causing the receiver to unsquelch, as indicated by block 108. In this mode the receiver remains coupled to the selected sector until such time as the received signal drops below a predetermined level for a predetermined time interval or the received signal ceases to contain the coded signal. If either of those events occur circuitry 110 which couples to the scan circuitry 100 causes the system to revert to the first, or general scan mode.

If the circuitry 106 determines that a received signal does not contain the proper coded tone, i.e. that the received signal is from an interferer, it generates a $\overline{CS}$ signal which causes those peak values of signal strength contained in the first sample and hold array resulting from the continuing scan mode to be retained as the reference level to which subsequently received signals are compared. This operation is indicated by the block 112.

Now the system is activated to the alternate scan state represented by block 114. In the alternate scan mode all sectors are sequentially coupled to the receiver as in the general scan mode. If, during the alternate scan mode, the signal being received by the sectors drops to a minimum or noise level a signal $\overline{X}_r$ is generated which couples to the scan block 100 and reverts the system to the general scan mode.

In the alternate scan mode the peak signal levels produced by these sectors are stored in a second sample and hold array. The peak signal level in the second sample and hold array for each sector is constantly compared to the corresponding peak level recorded in the first sample and hold array as caused by the interferer. If, for any sector, the value in the second sample hold array exceeds that in the first by a given voltage $\Delta V$ the system is again activated to a continuing scan mode represented by block 116. As with the previous continuing scan mode, scanning for all sectors continues for a predetermined time interval. At the end of that interval a signal C is generated which causes appropriate circuitry represented by block 118 to pick that sector which exhibited the highest signal and the predetermined $\Delta V$. Scan is now inhibited and this selected sector is coupled to the receiver for determination as to whether or not the received signal contains the proper coded signal, as indicated in block 120. If the proper coded signal is present an appropriate $\overline{CS}$ signal is coupled to block 108 causing the receiver to lock onto that sector for the duration of the signal. If, however, the signal from the selected sector does not contain the appropriate coded signal, a CS signal is generated causing the system to revert to the general scan mode.

Notice that once an interferer is detected, i.e. a transmitter which does not contain the proper coded signal, the system utilizes a signal level on each sector resulting from his transmission as the reference level for subsequent scanning. Without this feature, the system might constantly lock onto an interferring signal to the neglect of a weaker signal from another remote transmitter which does contain the proper coded signal.

FIG. 5 is a detailed block diagram of the preferred embodiment of the invention. Here, as in FIG. 3, the signals received by each sector of the sectored array 10 are coupled via coaxial cables 50 to an antenna switch 60. The antenna switch 60 responds to signals at its control input 60i, here shown to be a binary coded decimal number $\theta_1$, $\theta_2$ and $\theta_4$, to couple a selected sector to the input of the receiver 70. The receiver 70 includes a squelch input 70c, a first output 70b which couples to the signal strength detector 80, a second output 70d which is indicative of the presence of a coded signal on the received signal. The signal strength detector 80 produces output signals representative of the signal strength of signals received at its input.

The remainder of the circuitry in FIG. 5 comprises the scan control logic 90.

The scan control logic 90 generates the control signals for operating the antenna switch 60 via a clock 200 which feeds to a first gate 202 in turn feeding a counter 204 which feeds the second gate 206. The signal from the clock 200 is a standard frequency repetitive signal. This signal is caused to be gated by first gate 202 in response to signals A, C and D (the nature of which is discussed herein below) which may be applied to gate 202. The output from the gate 202 increments a counter 204 which splits the serial input into a parallel binary coded data output suitable for producing the binary coded control signals $\theta_1$, $\theta_2$ and $\theta_4$ which may also be gated by second gate 206, also controlled by the input signals A, C and D. Since the preferred embodiment of the invention contemplates using an antenna array containing eight sectors, the binary coded decimal control signal need only contain three places.

Thus, in its first or general scan mode the control signals $\theta_1$, $\theta_2$ and $\theta_4$ cause the antenna switch 60 to sequentially couple each antenna sector to the receiver 70. The output from the receiver is processed by the signal strength detector 80 which produces outputs having an amplitude representative of each sectors signal strength level. These signals are passed to the inputs 210a of a standard analog transmission gate 210. Transmission gate 210 responds to control signals at its control input 210b to pass signals at its first input 210a to either its first output 210c or its second output 210d. Here, the signal at the control input 210b is a signal D, the generation of which is described herein below, which is indicative of whether the system is operating in the first, i.e. general scan mode or the alternate scan mode.

Assuming the system is operating in the first, general scan mode the signal strength level signals are passed via the gate 210 to the input 212a of a second analog transmission gate 212. Also coupled to the transmission gate 212 are the control signals $\theta_1$, $\theta_2$ and $\theta_4$ which cause the gate 212 to route the appropriate signal strength from each sector to its own output lines 212b–212e. (With respect to FIG. 5, it should be understood that while the preferred embodiment of the invention contemplates an antenna array comprised of eight sectors, only four sectors are shown for purposes of this figure to minimize the complexity of the drawing.)

Each output line 212b–212e from the gate 212 couples to an appropriate input of the first sample and hold array 214. Sample and hold array 214 causes the peak value of the signal from each sector, as routed via the appropriate line 212b–212e, to be stored in a hold array, which is commonly comprised of a series of storage capacitors. These stored values may be cleared, or reset to a desired initial value by activation of a shunt 216.

The shunt 216 responds to input signals B, C and Z (the generation of which is described herein below) to apply a clear signal to each of its parallel output lines 216a–216d. These reference or clear level signals are then fed to the sample and hold array to change the values therein to the reference level.

A set of parallel outputs 214a–214d, containing each signal from an appropriate sector, from the first sample and hold array 214 are routed to a $\Delta V$ comparator 218 and a signal strength comparator 220. The signal strength comparator 220 and the $\Delta V$ comparator 218 both have a second set of inputs fed from a second sample and hold array 222. This array along with the $\Delta V$ comparator 218 are utilized during the alternate scan mode, as is described herein below.

The signal strength comparator 220 has an additional input fed from an absolute reference level source 224. In this, the general scanning mode the signal strength comparator 220 compares the magnitude of the signal level from each sector with the absolute reference level and activates an output line 220a should the level on any sector exceed the absolute reference level. The signal strength comparator 220 also produces a parallel set of outputs 220b–220e containing the signal levels from each detector, which are in turn coupled to the inputs 230a–230d of an encoder 230. The encoder 230 includes comparator circuitry for determining which sector produces the highest signal level.

Once it is determined that at least one sector is receiving a signal which exceeds the absolute reference level, the activated output 220a from the signal strength comparator 220 initiates the continued scan interval via the continued scan interval generator 240. As mentioned above, during this interval each sector continues to be scanned and the peak value from that sector is maintained in the first sample and hold array 214. At the conclusion of the continuing scan interval the generator 240 generates a signal designated as A. The signal A inhibits the first gate 202 and the second gate 206 thus inhibiting scanning of the sectors. The encoder 230 produces a binary coded decimal output on its output lines 230e–230g which cause second gate 206 to increment the antenna switch 60 to that sector whose peak stored value is the greatest during the scanning modes. Initially, the signal A activates a coded signal check circuit 250 which processes the coded signal output from the receiver 70 and determines whether or not the coded signal is present on that signal being received by the selected sector. If the proper coded signal is present the coded signal detector 250 produces an output signal S which couples to the receiver 70 at its input 70c and unsquelches the receiver. Signal S maintains the receiver 70 in the unsquelch mode and scan is inhibited. Scan is reinstituted, when the receiver is returned to the squelch condition.

If, however, the received signal from the selected sector does not contain the appropriate coded signal, the coded signal detector produces a $\overline{CS}$ signal which is applied both to a fail-safe flip-flop 252 and to one input 254a of a logic gate 24. The fail-safe flip-flop 252 produces an output signal D which is fed to the second input 254b of the logic gate 254. The signal D is also applied to gate 210 causing the system to activate to the alternate scan mode. Now, signals from the signal strength detector 80 are fed through the gate 210 to a third analog transmission gate 260. Gate 260 is similar to gate 212 in that it takes the serial input data from the sectors at its input terminal 260a and, via the binary coded decimal control signals $\theta_1$, $\theta_2$ and $\theta_4$, routes the sectored received signals to their corresponding output lines 260b–260e. These signals are coupled via the lines 260b–260e to the input terminals of the second sample and hold array 222. As with the first sample and hold array 214, the second array 222 stores the peak value of each signal received by its sector. A second shunt 262, which is similar to shunt 216, responds to any of the control input signals C, D and Z to clear the sample and hold array 222 such that each stored cell in the array is set to an initial value.

Output lines 222a–222d from the second sample and hold array 222 contain those peak signal levels sensed by the signal strength detector for each sector. These outputs are applied both to the $\Delta V$ comparator 218 and the signal strength comparator 220. In this, the alternate scan mode, the $\Delta V$ comparator 218 constantly compares the peak signal received by each sense sector and stored in the second sample and hold array 222 to that value stored in the first sample and hold array 214, which is representative of the interferer's signal level. Should the signal level stored by the second sample and hold array 222 exceed that for the same sector in the first sample and hold array 214 by a predetermined amount the $\Delta V$ comparator 218 activates its output line 270 which initiates the continuing scan interval via the continuing scan interval generator 272. As with the first continuing scan interval generator 240 scan is continued for a predetermined interval after which an output signal C is produced corresponding to the output signal A from the first scan interval generator 240. The signal C couples to the first shunt 216 to cause clearing of the first sample and hold array 214. Also, the signal C couples to the second shunt 262 to clear the memory of each sector which does not contain an increase of $\Delta V$ over those values stored in the first sample and hold array. This information is transferred to shunt 262 by the ΔV comparator output lines 218a–218d.

The signal C is also applied to the first and second gates 202 and 206 whereby scan is inhibited.

Since it takes the shunt a finite interval to clear the sample and hold arrays, the signal C is processed through a shunt interval timer 290 before being applied to the encoder 230. Once applied to the encoder 230, the encoder determines of those sectors which exhibited a minimal change of at least ΔV, which one has the strongest signal. Once this is determined the encoder 230 via its output 230c–230g activates the second gate 206 such that the selected sector is coupled to the scan receiver 70. As with the signal A, the signal C couples to the coded signal detector 250 to determine whether or not the coded signal is contained on the selected sector. If it is, the coded signal detector produces a signal S which unsquelches the receiver. If, however, the signal does not contain the proper coded signal the coded signal detector 250 produces an output signal $\overline{CS}$ which once again activates the fail-safe flip-flop 252 and is applied to the first input 254a of the start again gate 254. Now, the output signal D from the fail-safe flip-flop is activated with the opposite state whereby the AND gate 254 activates its output thus producing signal B. The signal B is used to activate the shunts 216, 262 to clear every storage cell in the sample and hold registers 214 and 222 such that the system may revert to the first or general scan mode. Notice that due to a polarity change of the signal D the transmission gate 210 now routes all the sector level signals over its first output 210c thus reestablishing the first or general scan mode.

The fail-safe flip-flop, thus, clears both sample and hold arrays on every second interferer sequence thus making sure that the sample and hold array storage cells don't continuously charge up to overlimit values whereby the system is rendered inoperative.

Finally, the output from the signal strength detector 80 couples to a zero signal detector 300. The zero signal detector generates one of two output signals F or Z in response to the signal level of all signals received by the sectors diminishing below some predetermined level for a predetermined time interval. Thus, output signal F is generated to clear the system if an incoming signal is lost while the system is in the continuing scan or the coded signal detect condition. Otherwise, the system is cleared by activating the output Z which couples to the shunts 216 and 262.

In summary, a unique multiple mode sectored antenna receiving system has been described.

While a preferred embodiment of the invention has been described in detail, it should be apparent that many modifications and variations thereto are possible, all of which fall within the true spirit and scope of the invention.

For example, while the system has been discussed for use with a single receiver, it should be understood that a plurality of receivers, each operating on a different frequency, could simultaneously share the antenna array.

We claim:

1. A radio frequency communication system comprising:
    a sectored antenna means having a plurality of sectors, each sector predeterminedly oriented with respect to the remaining sectors;
    an antenna switch means having a plurality of input terminals, a control terminal, and an output terminal and further including means responsive to control signals at the control terminal to couple a selected input terminal to the output terminal;
    antenna coupling means for coupling each antenna sector to a predetermined input terminal of the antenna switch means;
    receiver means adapted for receiving radio frequency signals;
    signal strength detector means, coupled to the receiver means, for producing a signal representative of the strength of the radio frequency signal being received;
    receiver coupling means for coupling the antenna switch means output terminal to the receiver means; and
    scan control logic means, having an input coupled to the signal strength detector and an output coupled to the antenna switch means control terminal, and operable in a first mode for producing control signals at its output causing sequential coupling of the sectors to the receiver means for effecting the scanning thereof, the scan control logic means including comparator means for monitoring the signal strength detector produced signal and activating the scan control logic to a second mode in response to said signal being of predetermined magnitude, the scan control logic means operable in its second mode to continue sector scanning for a predetermined interval after which scanning is inhibited and the receiver is coupled to that sector which produces the greatest detected signal strength.

2. The communication system of claim 1 wherein the scan control logic means further comprises means for activating the scan control logic from its second to its first mode in response to the detected signal strength of the sector to which the receiver is coupled diminishing to a predetermined level for a predetermined time interval.

3. The communication system of claim 1 wherein the receiver means comprises decoding means for determining whether the signal being coupled to the receiver contains a predetermined coding signal, and wherein the scan control logic means comprises:
    (a) means for activating the scan control logic from its second to its first mode in response to the decoding means determining the absence of said coded signal, and
    (b) means for continuing scan in the second mode for a predetermined interval and thereafter coupling the receiver to that sector which produces the strongest detected signal and said coding signal.

4. The communication system of claim 1 wherein the receiver means comprises decoding means for determining whether the signal being coupled to the receiver contains a predetermined coding signal, and wherein the scan control logic means comprises:
    (a) means for activating the scan control logic from its first to its second mode in response to the detected signal strength of at least one sector being above a predetermined threshold level,
    (b) means for continuing scan in the second mode for a predetermined interval,
    (c) means for storing the detected signal strength levels of the sectors in a first storage array,
    (d) means for identifying those sectors whose second array stored signals are at least a predetermined level above said predetermined threshold level, (e) means for inhibiting scan and coupling the receiver to that sector of the identified sectors which produces the strongest detected signal and said coded signal, and (f) reverting means for reverting the scan control logic to its first mode in the absence of a detected coded signal.

5. The communication system of claim 4 wherein the reverting means further comprises:

alternate scan means for responding to a received signal which does not contain said coded signal to revert the scanning control to its first mode and to cause the first array stored values of said received signals to become said predetermined threshold level; and second storage array means for storing subsequently received sector signal strength signals and second comparator means for causing the scan control logic to activate to the continuing scan mode in response to the second array signal strength value of at least one sector exceeding its corresponding threshold value in the first array by a predetermined value.

6. The communication system of claim 5 wherein the alternate scan means further comprises means to inhibit scan and couple the receiver to that sector which, at the conclusion of the continuing scan interval, exhibits the largest second array stored signal and which exhibits said predetermined value increase over its first array stored signal.

7. The communication system of claim 6 wherein the alternate scan means further comprises means to cause the scan logic to revert to the first scan mode in response to said sector received signal failing to contain said coded signal.

8. The communication system of claim 5 further comprising means for causing said predetermined threshold level to become a predetermined absolute value in response to all received signal strengths from the sectors dropping to a value below the previous threshold level.

9. The communication system of claim 1 wherein the receiver means includes squelching circuitry for squelching the receiver output and wherein the scan control logic means includes means to squelch the receiver output except for those periods wherein scan is inhibited.

10. The communication system of claim 3 wherein the scan control logic means further comprises means for activating the scan control logic from its second to its first mode in response to the detected signal strength of the sector to which the receiver is coupled diminishing to a predetermined level for a predetermined time interval.

11. The communication system of claim 4 wherein the scan control logic means further comprises means for activating the scan control logic from its second to its first mode in response to the detected signal strength of the sector to which the receiver is coupled diminishing to a predetermined level for a predetermined time interval.

12. The communication system of claim 3 wherein the receiver means includes squelching circuitry for squelching the receiver output and wherein the scan control logic means includes means to squelch the receiver output except for those periods wherein scan is inhibited.

13. The communication system of claim 4 wherein the receiver means includes squelching circuitry for squelching the receiver output and wherein the scan control logic means includes means to squelch the receiver output except for those periods wherein scan is inhibited.

14. The communication system of claim 1 wherein each antenna sector is horizontally directive with the sectors arranged to respond to signals originating from a predetermined angle in the horizontal plane.

15. The method of receiving a radio frequency broadcast signal comprising the steps of:

(a) providing a multisectored antenna array;

(b) orienting each sector in predetermined relationship with respect to the remaining sectors;

(c) scanning the array by sequentially switching the signal from each sector to a receiver means;

(d) detecting, via the receiver means, the strength of the signal from each sector;

(e) comparing said signal strengths to a reference level and determining the condition of the signal strength level of at least one sector exceeding said reference level;

(f) continuing scan for a predetermined interval subsequent to determination of a sector signal strength exceeding said reference level; and (g) inhibiting scan following said predetermined interval and coupling the receiver to that sector which produced the greatest detected signal strength.

16. The method of claim 15 further comprising the step of activating from the inhibit scan mode to the scanning mode in response to the detected signal strength of the sector to which the receiver is coupled diminishing to a predetermined level for a predetermined time interval.

17. The method of claim 15 wherein the comparing step comprises the step of comparing said signal strengths to a predetermined absolute value level.

18. The method of claim 15 further comprising the steps of:

(a) decoding the received signal from the sectors and indicating whether said signals contain a predetermined coding signal; and (b) inhibiting scan subsequent to the continuing scan mode and coupling the receiver to that sector which produced the strongest received signal and which contains said coded signal.

19. The method of claim 18 comprising the further steps of:

(a) storing the relative detected signal strength levels of the sectors in a first storage array in response to said sector which produced the strongest received signal failing to contain said coded signal;

(b) storing the detected signal strength levels of the sectors from subsequent scans in a second array, and (c) activating the scan control logic to the continuing scan mode in response to the second array signal strength level exceeding its corresponding first array stored value by a predetermined value.

20. The method of claim 19 further comprising the step of:

identifying those sectors whose second array stored signals are at least a predetermined level above the first array stored signals at the conclusion of the continuing scan interval;

and wherein the inhibiting step comprises the step of inhibiting scan and coupling the receiver to that sector of the identified sectors which exhibits the largest second array stored signal and which contains said coded signal.

21. The method of claim 20 further comprising the step of reverting from the continuing scan mode to the scanning mode in response to the decoding means failing to indicate the presence of the coded signal in the sector received signals.

22. The method of claim 15 comprising the further step of causing said reference level signal to revert to a predetermined absolute value level in response to all received signal strengths from the sectors dropping to values below the previous reference level.

23. The method of claim 15 comprising the further step of squelching the output from the receiver except when scan is inhibited.

24. The method of claim 15 wherein the step of providing a multisectored antenna array includes the further steps of:

(1) providing horizontally directive antenna sectors, and (2) arranging the sectors to respond to signals originating from a predetermined angle in the horizontal plane.

* * * * *